US011584329B2

(12) United States Patent
Sung et al.

(10) Patent No.: US 11,584,329 B2
(45) Date of Patent: Feb. 21, 2023

(54) SEAT AIRBAG APPARATUS FOR VEHICLE

(71) Applicants: HYUNDAI MOTOR COMPANY, Seoul (KR); KIA MOTORS CORPORATION, Seoul (KR); HYUNDAI MOBIS CO., LTD., Seoul (KR)

(72) Inventors: Il Chang Sung, Hwaseong-si (KR); Sang Won Hwangbo, Yongin-si (KR); Choong Ryung Lee, Yongin-si (KR)

(73) Assignees: HYUNDAI MOTOR COMPANY, Seoul (KR); KIA MOTORS CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 159 days.

(21) Appl. No.: 17/096,693

(22) Filed: Nov. 12, 2020

(65) Prior Publication Data

US 2021/0402949 A1 Dec. 30, 2021

(30) Foreign Application Priority Data

Jun. 24, 2020 (KR) .......................... 10-2020-0077446

(51) Int. Cl.
*B60R 21/231* (2011.01)
*B60R 21/207* (2006.01)
(Continued)

(52) U.S. Cl.
CPC ...... *B60R 21/23138* (2013.01); *B60R 21/207* (2013.01); *B60R 21/2338* (2013.01);
(Continued)

(58) Field of Classification Search
CPC ............ B60R 21/23138; B60R 21/207; B60R 21/2338; B60R 2021/0048;
(Continued)

(56) References Cited

U.S. PATENT DOCUMENTS

2020/0406855 A1* 12/2020 Saito .................... B60R 21/2338
2021/0370863 A1* 12/2021 Gwon ............... B60R 21/23138
2022/0089118 A1* 3/2022 Schneider ............. B60R 21/233

FOREIGN PATENT DOCUMENTS

DE 102018114771 A1 * 12/2019 ........... B60R 21/207
DE 102020101051 A1 * 7/2021
(Continued)

OTHER PUBLICATIONS

Dae et al. KR 10-2064842 B1 Airbag Apparatus of Vehicle, Machine English Translation, ip.com. (Year: 2020).*

*Primary Examiner* — Karen Beck
(74) *Attorney, Agent, or Firm* — Lempia Summerfield Katz LLC

(57) ABSTRACT

A seat airbag apparatus for a vehicle is disclosed. A side cushion is deployed so as to protrude forward from a seatback in order to protect the lateral sides of an occupant, and a front cushion is deployed so as to protrude from the side cushion to the front of the occupant in order to protect the front side of the occupant. The deployment of the side cushion and the front cushion is limited by an upper dual-surface tether structure, formed by an upper-side surface tether and an upper-front surface tether, and a lower dual-surface tether structure, formed by a lower-side surface tether and a lower-front surface tether, thereby increasing force with which movement of the occupant is restricted, thus further enhancing an occupant protection effect.

19 Claims, 9 Drawing Sheets

(51) Int. Cl.
*B60R 21/2338* (2011.01)
*B60R 21/233* (2006.01)
*B60R 21/00* (2006.01)

(52) U.S. Cl.
CPC ................ *B60R 2021/0048* (2013.01); *B60R 2021/23146* (2013.01); *B60R 2021/23308* (2013.01)

(58) Field of Classification Search
CPC ........... B60R 2021/23146; B60R 2021/23308; B60R 21/233; B60R 2021/23386; B60R 21/239
See application file for complete search history.

(56) References Cited

FOREIGN PATENT DOCUMENTS

| | | | | |
|---|---|---|---|---|
| DE | 102020103916 A1 | * | 8/2021 | |
| JP | 2019137307 A | * | 8/2019 | ....... B60R 21/23138 |
| KR | 10-2019-0020254 | | 2/2019 | |
| KR | 10-2019-0109812 A | | 9/2019 | |
| KR | 102064842 B1 | * | 1/2020 | |

\* cited by examiner

SEAT AIRBAG APPARATUS FOR VEHICLE

CROSS-REFERENCE TO THE RELATED APPLICATION

This application claims priority to and the benefit of Korean Patent Application No. 10-2020-0077446, filed on Jun. 24, 2020, the entire contents of which are incorporated herein by reference.

FIELD

The present disclosure relates to a seat airbag apparatus for a vehicle, and more particularly to an airbag apparatus for a seat of a vehicle.

BACKGROUND

The statements in this section merely provide background information related to the present disclosure and may not constitute prior art.

An autonomous vehicle is a kind of smart vehicle employing autonomous driving technology by which the vehicle is capable of autonomously travelling to a set destination by itself without manipulation of the steering wheel, the accelerator, the brake, or the like by a driver. These days, the development of such autonomous vehicles is accelerating.

When autonomous driving technology is commercialized, a driver will be able to select a relaxation mode to take a rest while traveling in a vehicle, rather than directly driving the vehicle, and in the relaxation mode, an occupant will be able to freely move or rotate a seat or to variously change the posture of the seat as desired.

However, we have discovered that in the event of an accident, a conventional airbag apparatus for a vehicle is not capable of effectively restricting the movement of occupants in different sitting postures in an autonomous driving situation.

The information disclosed in this Background section is only for enhancement of understanding of the general background of the present disclosure and should not be taken as an acknowledgement or any form of suggestion that this information forms the related art already known to a person skilled in the art.

SUMMARY

The present disclosure provides a seat airbag apparatus for use in autonomous vehicles, which is capable of effectively restricting the movement of an occupant in lateral, forward, and oblique directions using a side cushion configured to be deployed forward from a seatback and a front cushion configured to be deployed from the side cushion to the front of the occupant, thereby more effectively protecting the occupant.

In addition, the present disclosure limits the deployment of a side cushion and a front cushion using an upper dual-surface tether structure and a lower dual-surface tether structure, thereby further increasing the force with which movement of an occupant is restricted, thus reducing the risk of injury to the occupant.

In accordance with the present disclosure, the above and other objects can be accomplished by the provision of a seat airbag apparatus for a vehicle, including a side cushion configured to be deployed so as to protrude forward from a seatback and a front cushion configured to be deployed so as to protrude from the side cushion to the front of an occupant, the seat airbag apparatus further including an upper-side surface tether connecting the side cushion to the upper end of the seatback, the upper-side surface tether being configured to spread in the shape of a plane when the side cushion is deployed in order to limit deployment of the side cushion, and an upper-front surface tether connecting the front cushion to the upper end of the seatback, the upper-front surface tether being configured to spread in the shape of a plane when the front cushion is deployed in order to limit deployment of the front cushion.

The seat airbag apparatus may further include a lower-side surface tether connecting the side cushion to a lower end portion of the seatback, the lower-side surface tether being configured to spread in the shape of a plane when the side cushion is deployed in order to limit deployment of the side cushion and inhibit the side cushion from lifting, and a lower-front surface tether connecting the front cushion to the lower end portion of the seatback, the lower-front surface tether being configured to spread in the shape of a plane when the front cushion is deployed in order to limit deployment of the front cushion and inhibit the front cushion from lifting.

Each of the side cushion, the front cushion, the upper-side surface tether, the upper-front surface tether, the lower-side surface tether, and the lower-front surface tether may be formed so as to be bilaterally symmetrical.

The upper-side surface tether and the upper-front surface tether may be configured to be deployed over the shoulders of the occupant so as to avoid injury to the neck of the occupant.

The upper-side surface tether may be formed so as to be deployed in the shape of a triangle. Any one vertex of the upper-side surface tether may be fixedly engaged with the upper end of the seatback, and one edge of the upper-side surface tether may be sewn to the upper end of the inner surface of the side cushion.

The upper-side surface tether may include two upper-side surface tethers disposed bilaterally symmetrically, and the vertices of the two upper-side surface tethers may be fixedly engaged with the upper end of the seatback at the same engagement point within an engagement region of a headrest.

The upper-side surface tether may include two upper-side surface tethers disposed bilaterally symmetrically, and the vertices of the two upper-side surface tethers may be fixedly engaged with the upper end of the seatback at different engagement points within the engagement region of the headrest such that the two upper-side surface tethers are crossed in an X-shape.

The upper-side surface tether may include two upper-side surface tethers disposed bilaterally symmetrically, and the vertices of the two upper-side surface tethers may be fixedly engaged with the upper end of the seatback at engagement points laterally spaced apart from each other within the engagement region of the headrest such that the two upper-side surface tethers are arranged in a V-shape.

The upper-front surface tether may be formed so as to be deployed in the shape of a triangle. Any one vertex of the upper-front surface tether may be fixedly engaged with the upper end of the seatback, and one edge of the upper-front surface tether may be sewn to the top surface of the front cushion.

The upper-front surface tether may include two upper-front surface tethers disposed bilaterally symmetrically, and the vertices of the two upper-front surface tethers may be fixedly engaged with the upper end of the seatback at different engagement points out of the engagement region of the headrest.

The lower-side surface tether may be formed so as to be deployed in the shape of a triangle. Any one vertex of the lower-side surface tether may be fixedly engaged with a center portion of a lower end portion of the seatback, and one edge of the lower-side surface tether may be sewn to a lower end portion of the inner surface of the side cushion.

The lower-front surface tether may be formed so as to be deployed in the shape of a triangle. Any one vertex of the lower-front surface tether may be fixedly engaged with a side portion of the lower end portion of the seatback, and one edge of the lower-front surface tether may be sewn to the bottom surface of the front cushion.

The lower-side surface tether may be deformed so as to bend toward the occupant due to interference with the occupant when deployed, and the side cushion and the front cushion may be respectively pulled toward the lateral sides and the front of the occupant by deformation of the lower-side surface tether so as to increase force with which movement of the occupant is restricted.

An upper separator and a lower separator having vent holes formed therein may be mounted so as to be vertically spaced apart from each other in the side cushion. The upper separator, the upper-side surface tether, and the sewing line of the upper-side surface tether may be aligned with each other in a lateral direction, and the lower separator, the lower-side surface tether, and the sewing line of the lower-side surface tether may be aligned with each other in the lateral direction.

The upper-side surface tether may include two upper-side surface tethers disposed bilaterally symmetrically, and the two upper-side surface tethers may be connected to each other via a first connection tether so as to be restricted from spreading outwards when deployed.

The upper-front surface tether may include two upper-front surface tethers disposed bilaterally symmetrically, and the two upper-front surface tethers may be connected to each other via a second connection tether so as to be restricted from spreading outwards when deployed.

The second connection tether may be located at a position further forward than the first connection tether so as to be adjacent to the back of the neck of the occupant.

The upper-side surface tether may include two upper-side surface tethers disposed bilaterally symmetrically, and the two upper-side surface tethers may be directly connected to each other in a sewing engagement manner such that the sewing engagement point therebetween is located behind the head of the occupant upon deployment so as to be restricted from spreading outwards when deployed.

The upper-front surface tether may include two upper-front surface tethers disposed bilaterally symmetrically, and the two upper-front surface tethers may be directly connected to each other in a sewing engagement manner such that the sewing engagement point therebetween is located behind the head of the occupant upon deployment so as to be restricted from spreading outwards when deployed.

DRAWINGS

The above and other objects, features and other advantages of the present disclosure will be more clearly understood from the following detailed description taken in conjunction with the accompanying drawings, in which.

Figure 8:
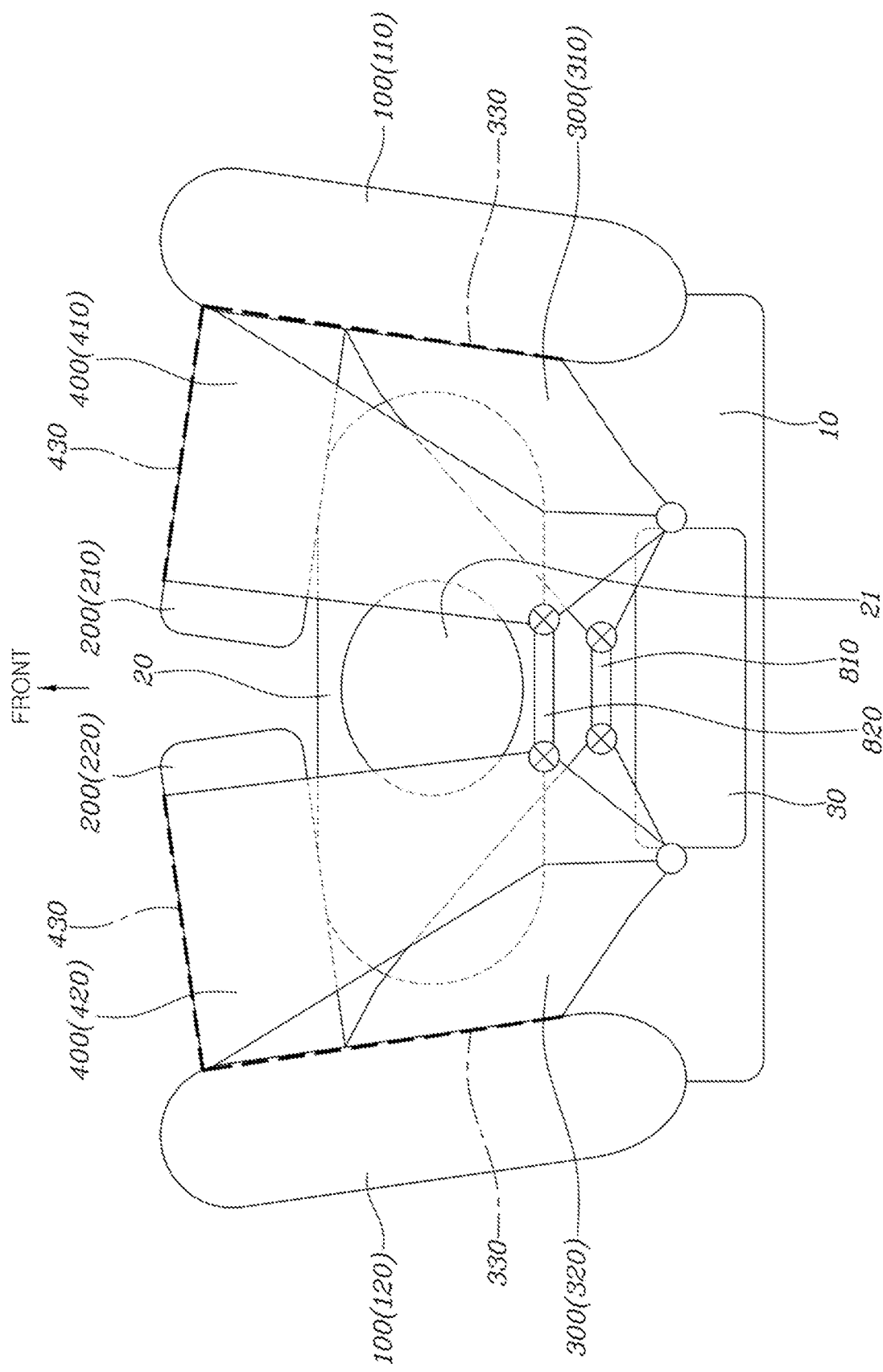
Figure 9:
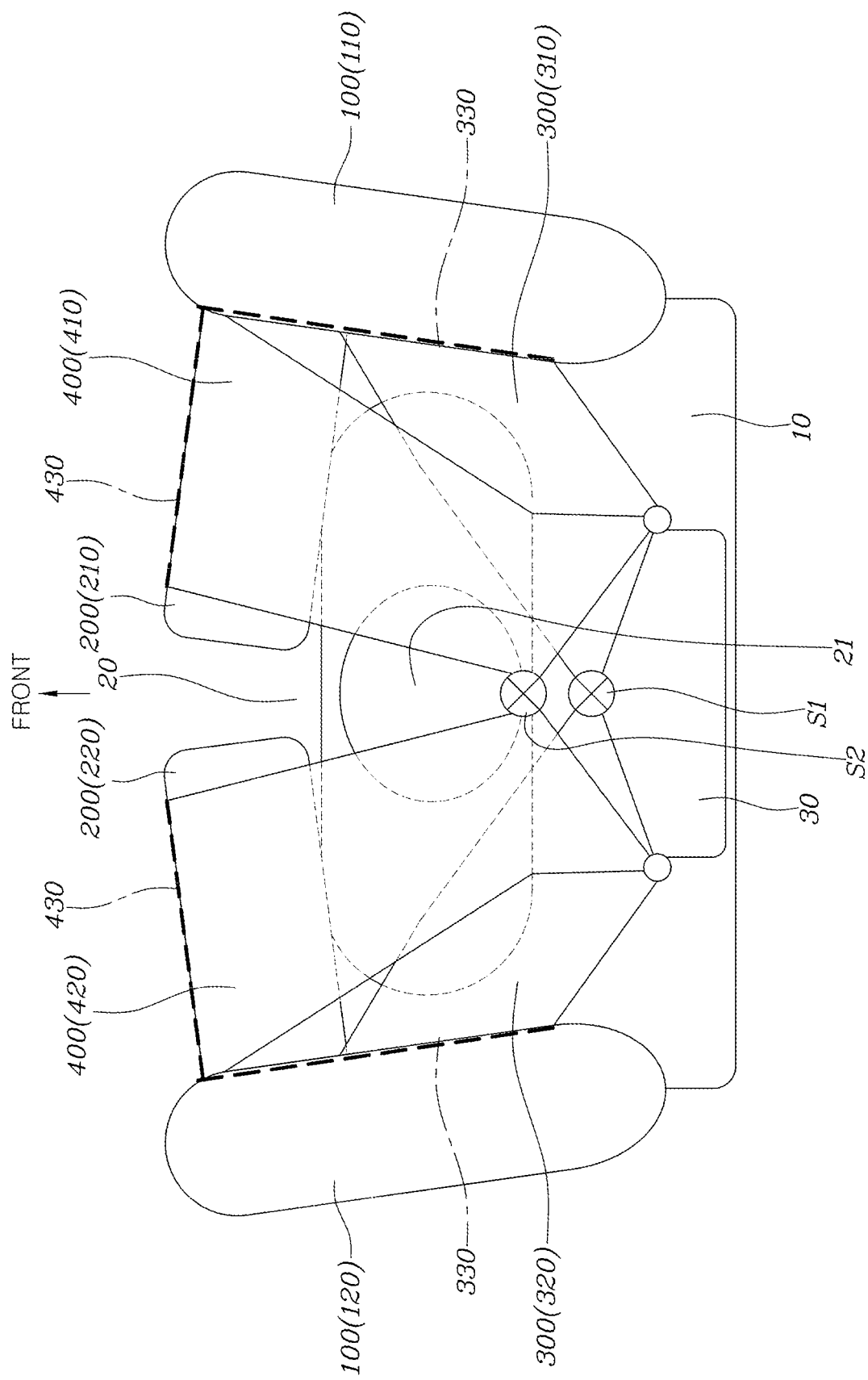

FIG. 8 is a view illustrating the structure in which two upper-side surface tethers are connected to each other via a first connection tether and the structure in which two upper-front surface tethers are connected to each other via a second connection tether according to one form of the present disclosure; and FIG. 9 is a view illustrating the structure in which two upper-side surface tethers are directly connected to each other in a sewing engagement manner and the structure in which two upper-front surface tethers are directly connected to each other in a sewing engagement manner according to another form of the present disclosure.

The drawings described herein are for illustration purposes only and are not intended to limit the scope of the present disclosure in any way.

DETAILED DESCRIPTION

Various exemplary forms will now be described more fully with reference to the accompanying drawings, in which only some exemplary forms are shown. Specific structural and functional details disclosed herein are merely representative for the purpose of describing exemplary forms. The present disclosure, however, may be embodied in many alternative forms, and should not be construed as being limited only to the exemplary forms set forth herein.

Accordingly, while exemplary forms of the present disclosure are capable of being variously modified and taking alternative forms, forms thereof are shown by way of example in the drawings and will herein be described in detail. It should be understood, however, that there is no intent to limit the present disclosure to the particular exemplary forms disclosed. On the contrary, exemplary forms are to cover all modifications, equivalents, and alternatives falling within the scope of the present disclosure.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary forms of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

The terminology used herein is for the purpose of describing particular forms only and is not intended to be limiting of exemplary forms of the present disclosure. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

A control unit (a controller) according to exemplary forms of the present disclosure may be implemented through a processor (not illustrated) configured to execute the operation to be described below using a nonvolatile memory (not illustrated), which is configured to store an algorithm for controlling the operation of various components of a vehicle or data related to a software command for executing the algorithm, and data stored in the corresponding memory. Here, the memory and the processor may be implemented as respective chips. Alternatively, the memory and the processor may be implemented as a single integrated chip. The processor may alternatively take the form of one or more processors.

Hereinafter, a seat airbag apparatus for a vehicle according to an exemplary form of the present disclosure will be described with reference to the accompanying drawings.

As shown in FIGS. 1 to 7, a seat airbag apparatus for a vehicle according to some forms of the present disclosure includes: a side cushion 100, which is configured to be deployed so as to protrude forward from a seatback 10 constituting a seat of the vehicle in order to cover and protect the lateral sides of an occupant 20, and a front cushion 200, which is configured to be deployed so as to protrude from the side cushion 100 to the front of the occupant 20 in order to cover and protect the front side of the occupant 20.

Each of the side cushion 100 and the front cushion 200 is formed so as to be bilaterally symmetrical with respect to the seatback 10. That is, the side cushion 100 is composed of a right side cushion 110 and a left side cushion 120, and the front cushion 200 is composed of a right front cushion 210 and a left front cushion 220.

In addition, the seat airbag apparatus further includes an upper-side surface tether 300, which connects the side cushion 100 to the upper end of the seatback 10 and is configured to spread in the shape of a plane having a predetermined size when the side cushion 100 is deployed in order to limit the deployment of the side cushion 100, an upper-front surface tether 400, which connects the front cushion 200 to the upper end of the seatback 10 and is configured to spread in the shape of a plane having a predetermined size when the front cushion 200 is deployed in order to limit the deployment of the front cushion 200, a lower-side surface tether 500, which connects the side cushion 100 to the lower end portion of the seatback 10 and is configured to spread in the shape of a plane having a predetermined size when the side cushion is deployed in order to limit the deployment of the side cushion 100 and inhibit the side cushion 100 from lifting, and a lower-front surface tether 600, which connects the front cushion 200 to the lower end portion of the seatback 10 and is configured to spread in the shape of a plane having a predetermined size when the front cushion 200 is deployed in order to limit the deployment of the front cushion 200 and inhibit the front cushion 200 from lifting.

Each of the upper-side surface tether 300, the upper-front surface tether 400, the lower-side surface tether 500, and the lower-front surface tether 600 is formed so as to be bilaterally symmetrical with respect to the seatback 10.

In one form, the upper-side surface tether 300 includes a right upper-side surface tether 310 and a left upper-side surface tether 320. The upper-front surface tether 400 is composed of a right upper-front surface tether 410 and a left upper-front surface tether 420. The lower-side surface tether 500 is composed of a right lower-side surface tether 510 and a left lower-side surface tether 520. The lower-front surface tether 600 is composed of a right lower-front surface tether 610 and a left lower-front surface tether 620.

The airbag apparatus according to the present disclosure is configured such that the side cushion 100 is first deployed so as to protrude from the seatback 10, and subsequently, the front cushion 200 is deployed so as to spread from the side cushion 100. With this configuration, the airbag apparatus enables movement or rotation of a seat, and thus is advantageously suitable for use in autonomous vehicles, in which occupants take various sitting postures.

Further, according to the form of the present disclosure, the tethers for limiting deployment of the side cushion 100 and the front cushion 200 are surface tethers having a predetermined area, rather than general string-type tethers. Particularly, sufficient force for limiting deployment of the side cushion 100 and the front cushion 200 is secured by the upper dual-surface tether structure, formed by the upper-side surface tether 300 and the upper-front surface tether 400, and the lower dual-surface tether structure, formed by the lower-side surface tether 500 and the lower-front surface tether 600, thereby effectively restricting the movement of an occupant in lateral, forward, and oblique directions and further enhancing the occupant protection effect, thus reducing the risk of injury to the occupant in the event of an accident.

When deployed, the side cushion 100 according to the present disclosure covers and protects the head 21, the shoulders, the chest, the abdomen, and the pelvis of the occupant 20 from the lateral direction of the occupant 20. Further, when deployed, the front cushion 200 covers and protects the portion of the body from the shoulders to the abdomen of the occupant 20 from the forward direction of the occupant 20.

Since the shoulders, which have relatively high stiffness among the body parts of the occupant 20, are covered and protected both by the side cushion 100 and by the front cushion 200, it is possible to reduce injury to the occupant in the event of an accident.

In particular, since the side cushion 100 and the front cushion 200 strongly restrict movement of the occupant 20 using the upper dual-surface tether structure, formed by the upper-side surface tether 300 and the upper-front surface tether 400, and the lower dual-surface tether structure, formed by the lower-side surface tether 500 and the lower-front surface tether 600, it is possible to better protect the occupant 20.

An inflator configured to spray airbag gas is fixedly engaged with a seatback frame that constitutes the seatback 10. The airbag gas generated upon explosion of the inflator is supplied to the side cushion 100 and the front cushion 200 in that order. Accordingly, the side cushion 100 is deployed first, and subsequently, the front cushion 200 is deployed by the pressure of the airbag gas.

Figure 7:
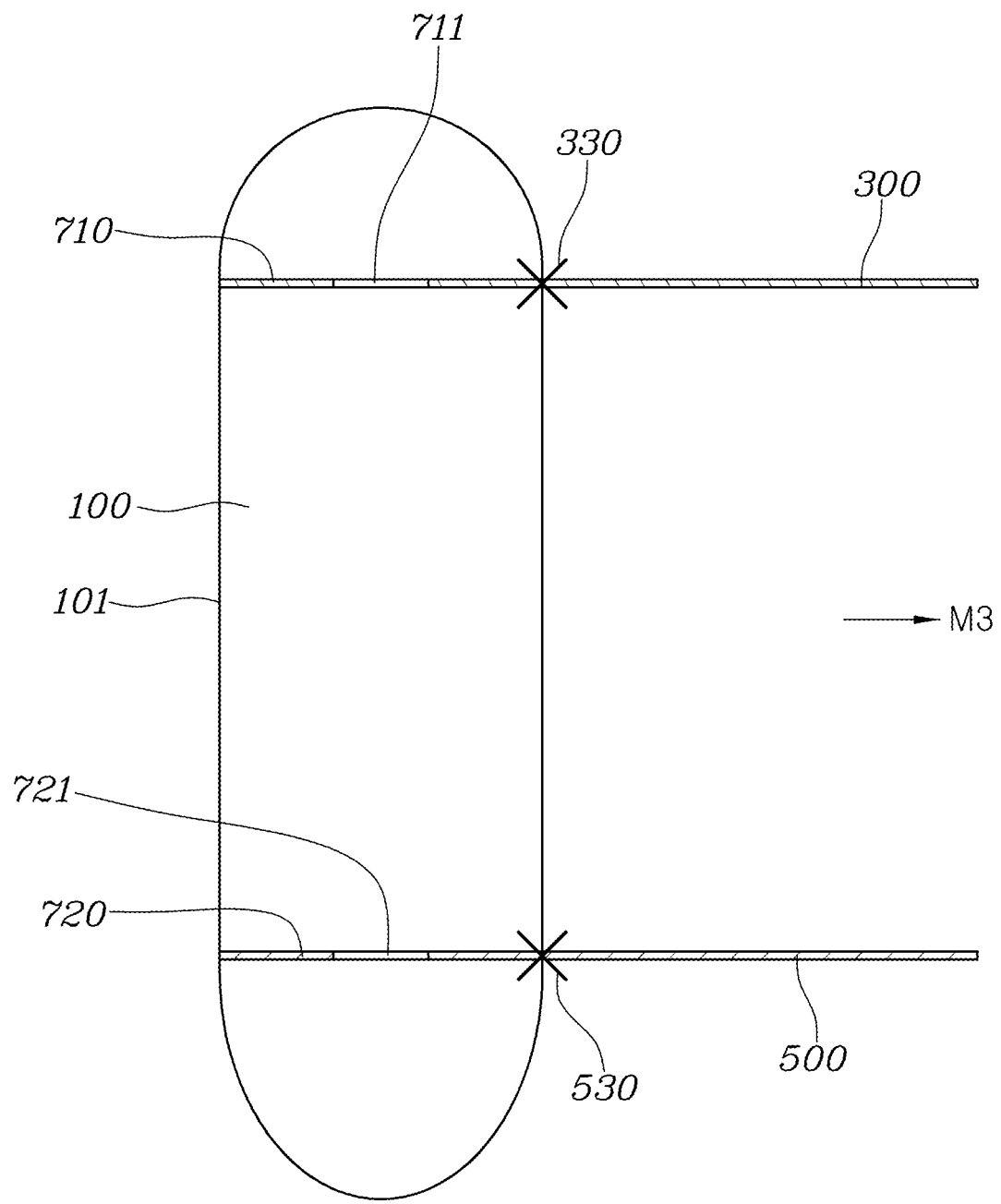
FIG. 7 is a view illustrating the structure in which the upper-side surface tether and the lower-side surface tether are connected to the outer surface of the side cushion via an upper separator and a lower separator according to one form of the present disclosure.

A plurality of separators is mounted in the side cushion 100 in order to set the deployment thickness of the side cushion 100 and partition the inner space in the side cushion 100. As shown in FIG. 7, an upper separator 710 and a lower separator 720 may be mounted in the side cushion 100 so as to be vertically spaced apart from each other. A plurality of vent holes 711 and 721 is respectively formed in the upper separator 710 and the lower separator 720 in order to control the flow of the airbag gas.

A separator having a vent hole formed therein may also be mounted in a portion at which the side cushion 100 and the front cushion 200 are connected to each other.

As described above, upon explosion of the inflator, the side cushion 100 is deployed first, and subsequently, the front cushion 200 is deployed. To this end, a large amount of airbag gas needs to be concentratedly supplied to the side cushion 100.

If the front cushion 200 is inflated and deployed before the side cushion 100 is deployed, the front cushion 200 may be caught between the occupant 20 and a door of the vehicle or between the occupant 20 and a center console, and thus is highly likely to fail to deploy properly due to the interference. In one form, the side cushion 100 may be deployed first and the front cushion 200 be deployed thereafter.

The upper-side surface tether 300 and the upper-front surface tether 400 are configured to be deployed over the shoulders of the occupant 20 to a region in which the neck of the occupant 20 is inhibited from being injured thereby while bypassing a region in which the tethers may hurt the neck of the occupant 20.

The upper-side surface tether 300 according to the present disclosure is formed so as to be deployed in the shape of a triangle, any one vertex of which is fixedly engaged with the upper end of the seatback 10 and one edge of which is sewn to the upper end of the inner surface of the side cushion 100. Reference numeral 330 indicates a sewing line formed by sewing the one edge of the upper-side surface tether 300 to the inner surface of the side cushion 100.

The upper-front surface tether 400 is formed so as to be deployed in the shape of a triangle, any one vertex of which is fixedly engaged with the upper end of the seatback 10 and one edge of which is sewn to the top surface of the front cushion 200. Reference numeral 430 indicates a sewing line formed by sewing the one edge of the upper-front surface tether 400 to the top surface of the front cushion 200.

In order to protect the occupant 20, it is advantageous for the right side cushion 110 and the left side cushion 120 to be pulled tightly toward the occupant 20 when deployed. In one form, the engagement point at which the vertex of the upper-side surface tether 300 is engaged with the upper end of the seatback 10 is located closer to the center of the occupant 20 than the engagement point at which the vertex of the upper-front surface tether 400 is engaged with the upper end of the seatback 10.

Figure 1:
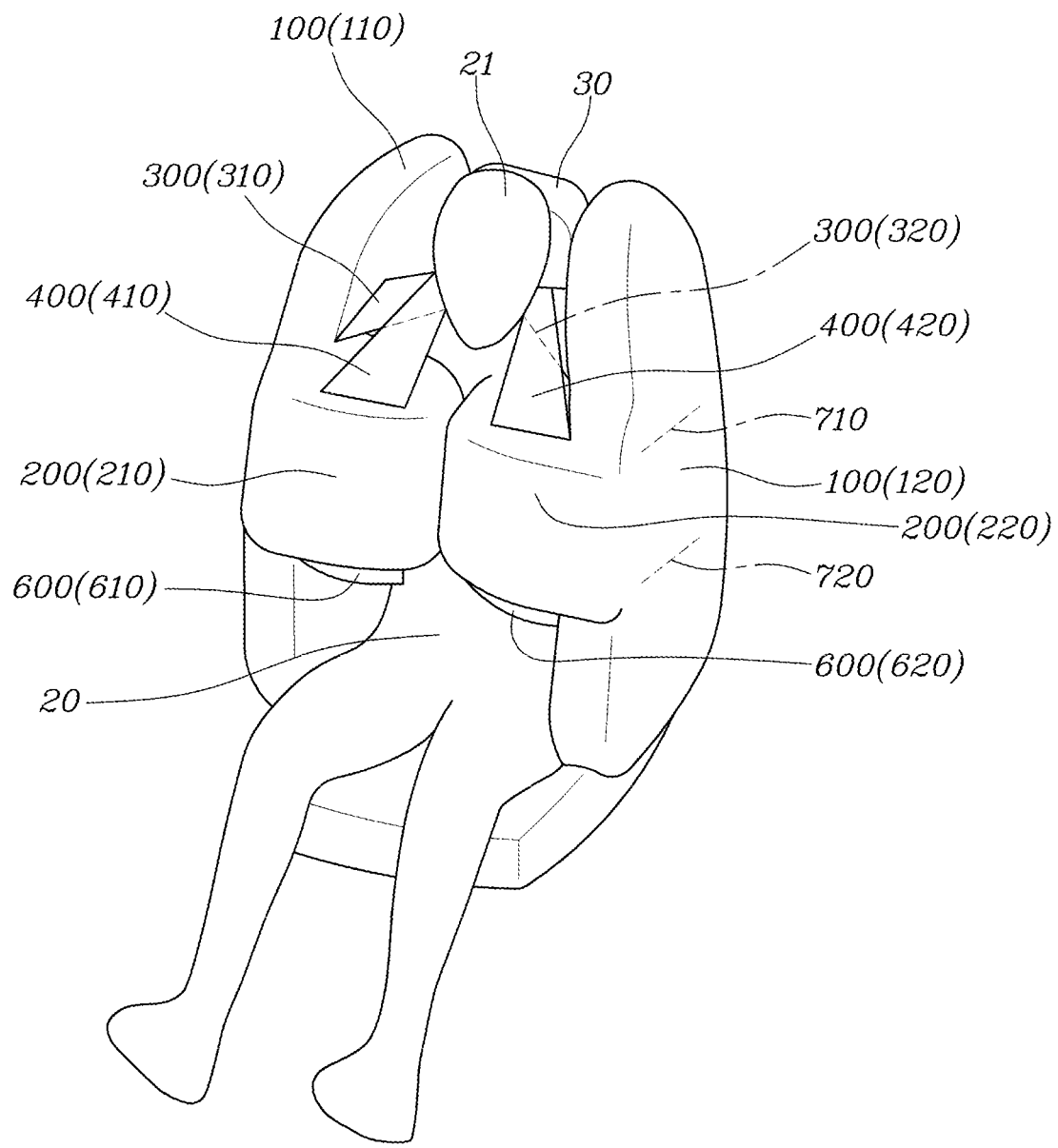
FIG. 1 is a perspective view illustrating the deployed state of a seat airbag apparatus for a vehicle according to one form of the present disclosure.
Figure 2:
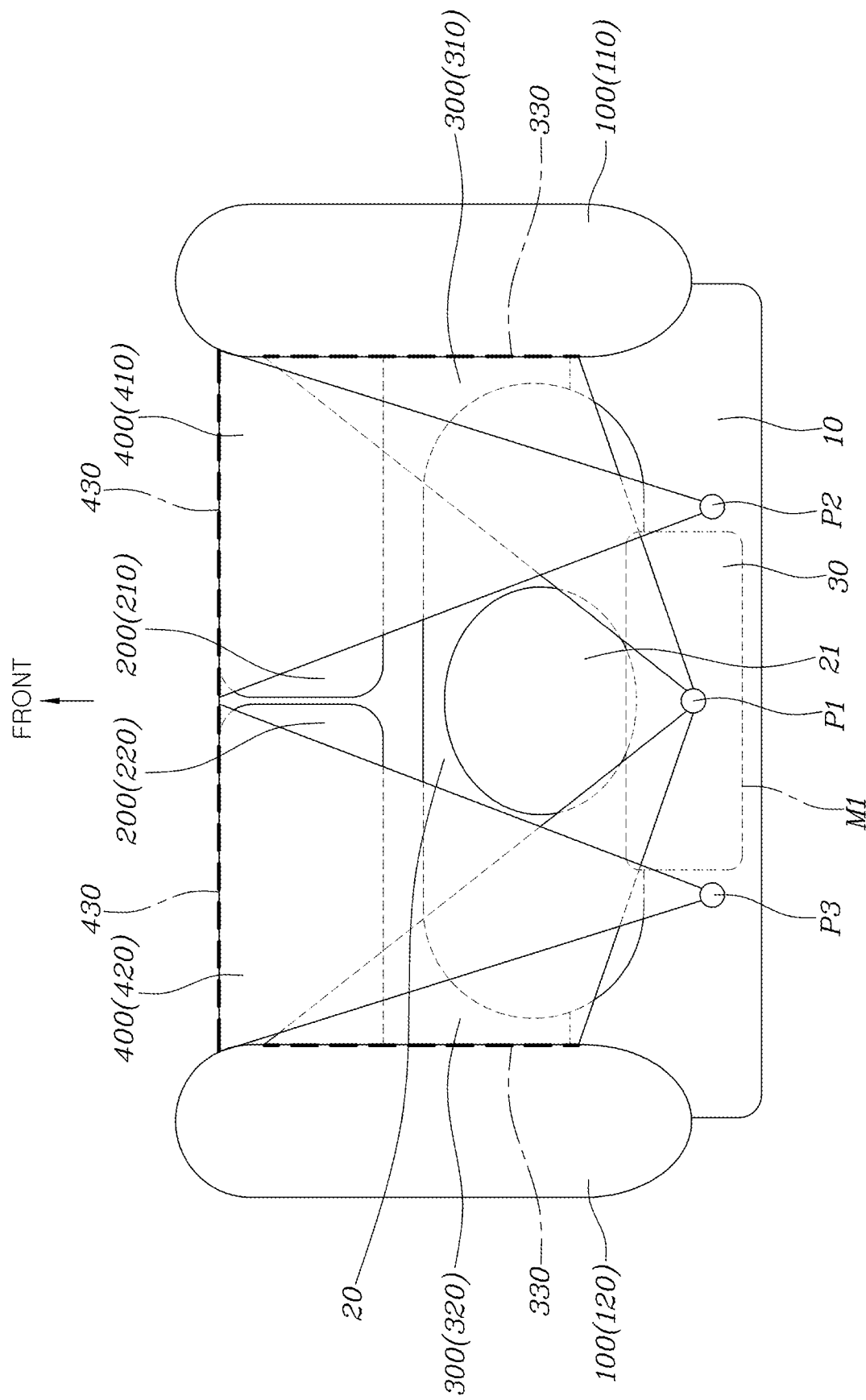
FIG. 2 is a plan view of FIG. 1, which illustrates an upper dual-surface tether structure formed by an upper-side surface tether and an upper-front surface tether according to one form of the present disclosure.

In FIG. 2, reference numeral P1 indicates an engagement point at which both the vertex of the right upper-side surface tether 310 and the vertex of the left upper-side surface tether 320 are fixedly engaged with the upper end of the seatback 10 within an engagement region M1 of a headrest 30, reference numeral P2 indicates an engagement point at which the vertex of the right upper-front surface tether 410 is fixedly engaged with the upper end of the seatback 10, and reference numeral P3 indicates an engagement point at which the vertex of the left upper-front surface tether 420 is fixedly engaged with the upper end of the seatback 10. The engagement points P2 and P3 are located out of the engagement region M1 of the headrest 30.

In other words, the upper-side surface tether 300 and the upper-front surface tether 400 are engaged with the upper end of the seatback 20 at a total of three engagement points P1, P2 and P3. In this case, since the engagement point P1 is located closer to the center of the occupant 20 than the engagement points P2 and P3, the side cushion 100 is pulled tightly toward the occupant 20 when deployed, thereby increasing the force with which movement of the occupant 20 is restricted, thus further enhancing the occupant protection effect.

Figure 4:
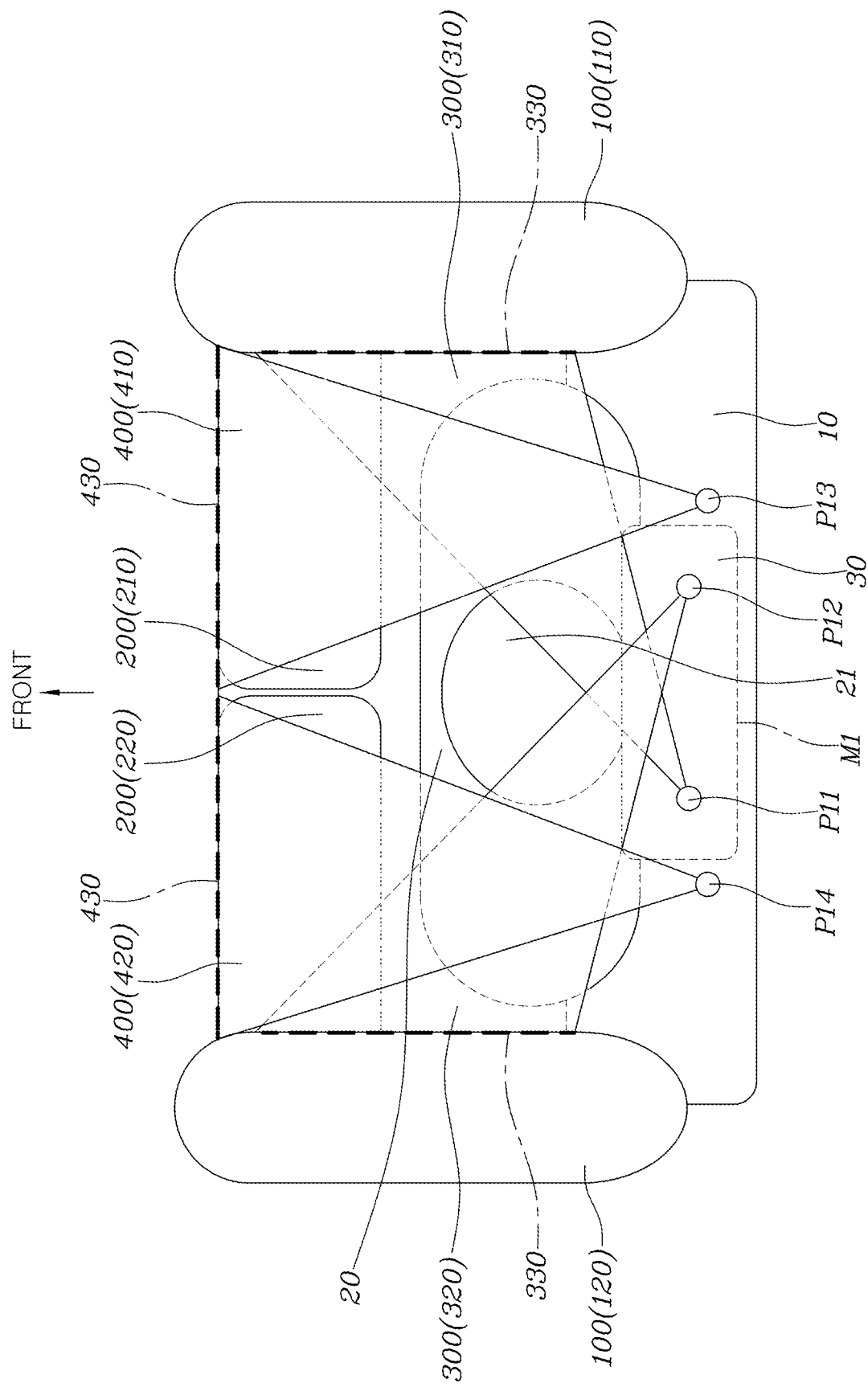
FIGS. 4 and 5 are views illustrating another form of the coupling structure of the upper-side surface tether according to some forms of the present disclosure.

In another form, as shown in FIG. 4, the vertex of the right upper-side surface tether 310 and the vertex of the left upper-side surface tether 320 are fixedly engaged with the upper end of the seatback 10 at different points within the engagement region M1 of the headrest 30 such that the right upper-side surface tether 310 and the left upper-side surface tether 320 are crossed in an X-shape. Here, reference numeral P11 indicates an engagement point at which the vertex of the right upper-side surface tether 310 is engaged with the upper end of the seatback 10, reference numeral P12 indicates an engagement point at which the vertex of the left upper-side surface tether 320 is engaged with the upper end of the seatback 10, reference numeral P13 indicates an engagement point at which the vertex of the right upper-front surface tether 410 is engaged with the upper end of the seatback 10, and reference numeral P14 indicates an engagement point at which the vertex of the left upper-front surface tether 420 is engaged with the upper end of the seatback 10. In other words, the upper-side surface tether 300 and the upper-front surface tether 400 are engaged with the upper end of the seatback 20 at a total of four engagement points P11, P12, P13 and P14.

Also, in this case, since the engagement points P11 and P12 are located closer to the center of the occupant 20 than the engagement points P13 and P14, the side cushion 100 is pulled tightly toward the occupant 20 when deployed, thereby increasing the force with which movement of the occupant 20 is restricted, thus further enhancing the occupant protection effect.

Figure 5:
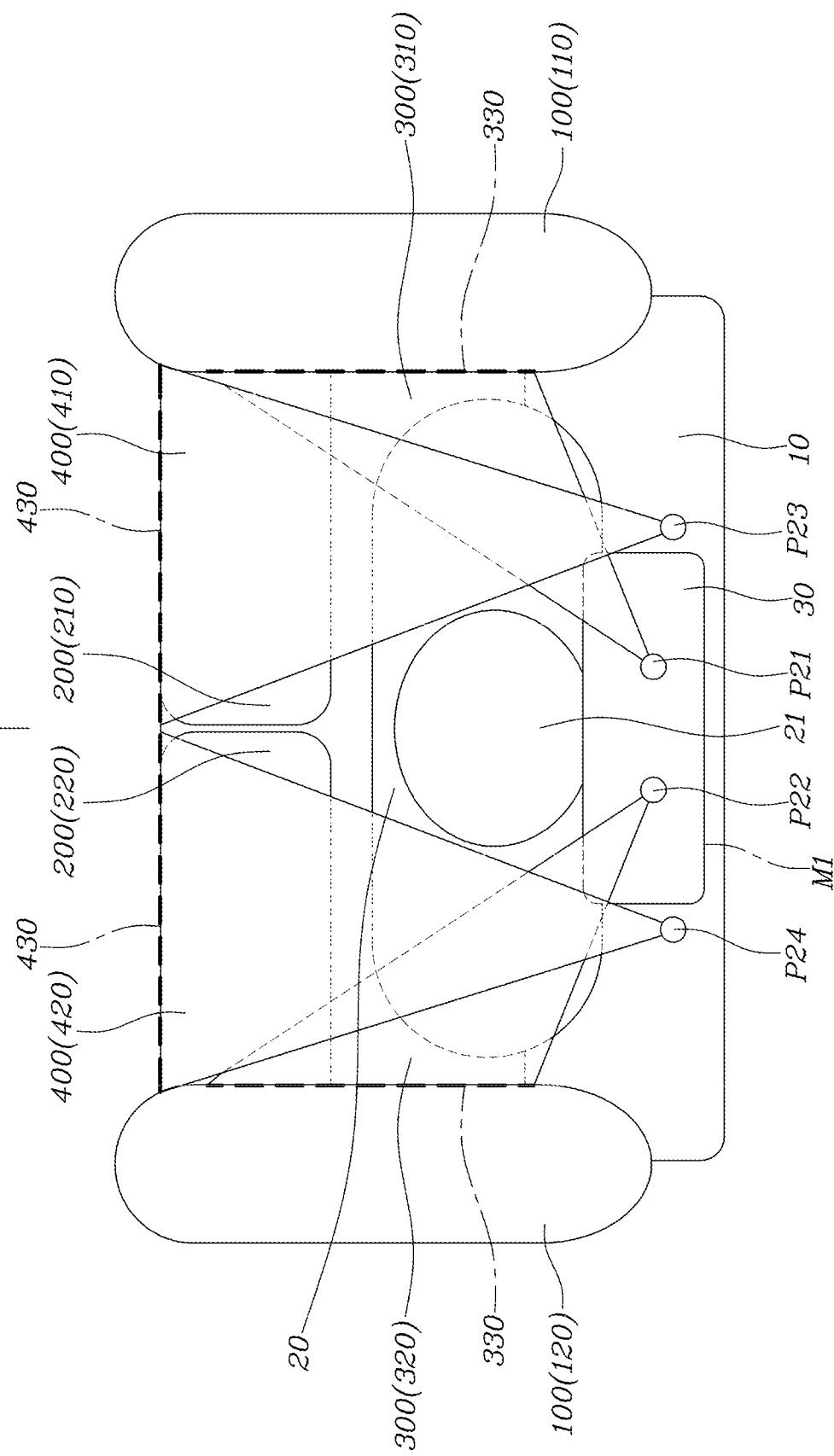

In still another form, as shown in FIG. 5, the vertex of the right upper-side surface tether 310 and the vertex of the left upper-side surface tether 320 are fixedly engaged with the upper end of the seatback 10 at points laterally spaced apart from each other within the engagement region M1 of the headrest such that the right upper-side surface tether 310 and the left upper-side surface tether 320 are arranged in a V-shape. Here, reference numeral P21 indicates an engagement point at which the vertex of the right upper-side surface tether 310 is engaged with the upper end of the seatback 10, reference numeral P22 indicates an engagement point at which the vertex of the left upper-side surface tether 320 is engaged with the upper end of the seatback 10, reference numeral P23 indicates an engagement point at which the vertex of the right upper-front surface tether 410 is engaged with the upper end of the seatback 10, and reference numeral P24 indicates an engagement point at which the vertex of the left upper-front surface tether 420 is engaged with the upper end of the seatback 10. In other words, the upper-side surface tether 300 and the upper-front surface tether 400 are engaged with the upper end of the seatback 20 at a total of four engagement points P21, P22, P23 and P24.

Also, in this case, since the engagement points P21 and P22 are located closer to the center of the occupant 20 than the engagement points P23 and P24, the side cushion 100 is pulled tightly toward the occupant 20 when deployed, thereby increasing the force with which movement of the occupant 20 is restricted, thus further enhancing the occupant protection effect.

The lower-side surface tether 500 according to the present disclosure is formed so as to be deployed in the shape of a triangle, any one vertex of which is fixedly engaged with a center portion of the lower end portion of the seatback 10 and one edge of which is sewn to the lower end portion of the inner surface of the side cushion 100. Reference numeral 530 indicates a sewing line formed by sewing the one edge of the lower-side surface tether 500 to the inner surface of the side cushion 100.

The lower-front surface tether 600 is formed so as to be deployed in the shape of a triangle, any one vertex of which is fixedly engaged with a side portion of the lower end portion of the seatback 10 and one edge of which is sewn to the bottom surface of the front cushion 200. Reference numeral 630 indicates a sewing line formed by sewing the one edge of the lower-front surface tether 600 to the bottom surface of the front cushion 200.

The lower-side surface tether 500 and the lower-front surface tether 600 may inhibit the side cushion 100 and the front cushion 200 from lifting upwards when deployed, thereby further increasing the force with which movement of the occupant 20 is restricted.

The lower-side surface tether 500 and the lower-front surface tether 600 are surface tethers having a predetermined area, rather than general string-type tethers. Particularly, sufficient force for limiting deployment of the side cushion 100 and the front cushion 200 is secured by the dual-surface tether structure formed by the lower-side surface tether 500 and the lower-front surface tether 600, thereby increasing the force with which movement of the occupant 20 is restricted, thus further enhancing the occupant protection effect.

Figure 3:
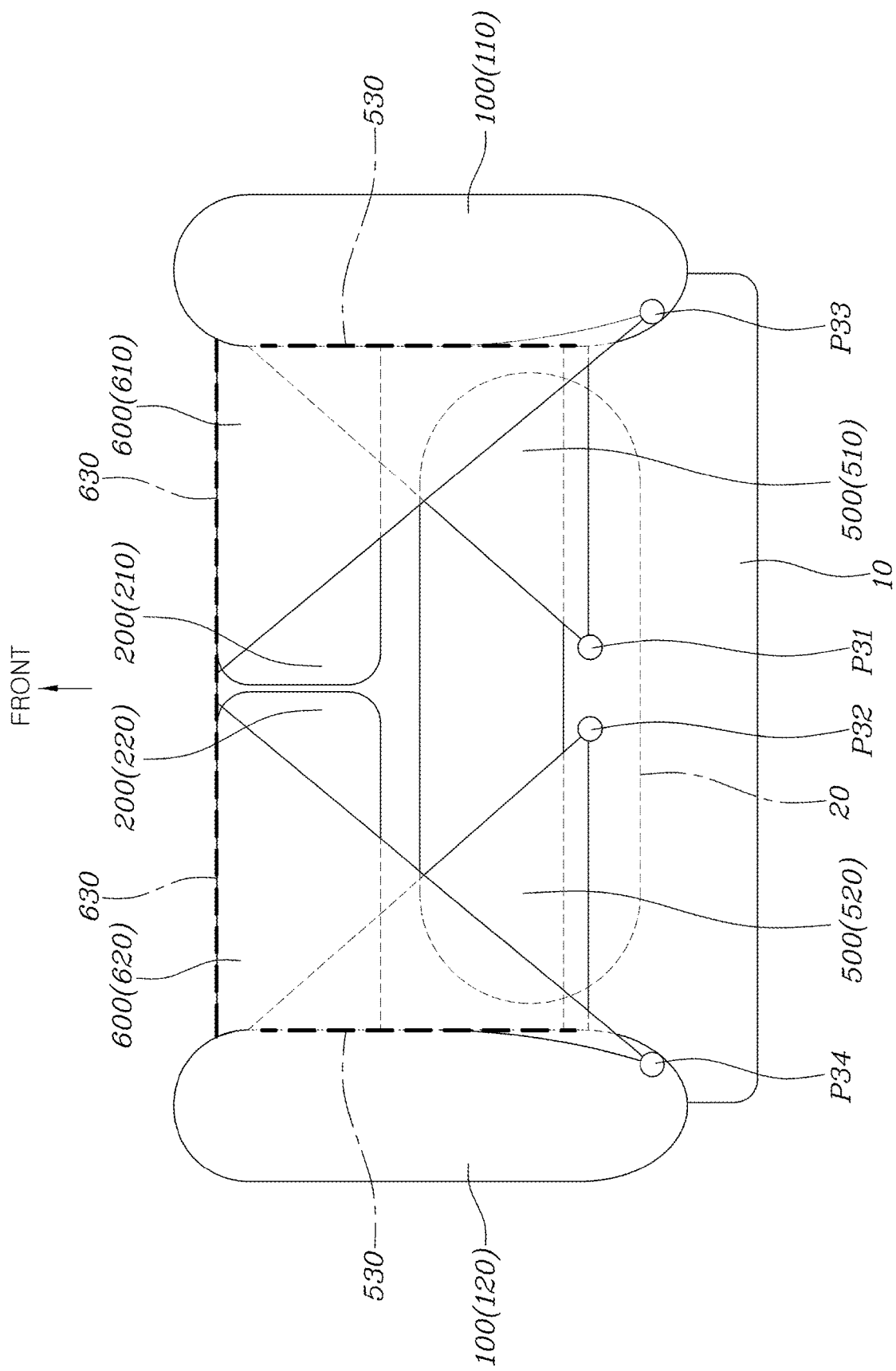
FIG. 3 is a bottom view of FIG. 1, which illustrates a lower dual-surface tether structure formed by a lower-side surface tether and a lower-front surface tether according to one form of the present disclosure.

Referring to FIG. 3, the vertex of the right lower-side surface tether 510 and the vertex of the left lower-side surface tether 520 are fixedly engaged with the center portion of the lower end portion of the seatback 10 at points laterally spaced apart from each other. Here, reference numeral P31 indicates an engagement point at which the vertex of the right lower-side surface tether 510 is engaged with the center portion of the lower end portion of the seatback 10, reference numeral P32 indicates an engagement point at which the vertex of the left lower-side surface tether 520 is engaged with the center portion of the lower end portion of the seatback 10, reference numeral P33 indicates an engagement point at which the vertex of the right lower-front surface tether 610 is engaged with a side portion of the lower end portion of the seatback 10, and reference numeral P34 indicates an engagement point at which the vertex of the left lower-front surface tether 620 is engaged with an opposite side portion of the lower end portion of the seatback 10. In other words, the lower-side surface tether 500 and the lower-front surface tether 600 are engaged with the lower end portion of the seatback 20 at a total of four engagement points P31, P32, P33 and P34.

Also, in this case, since the engagement points P31 and P32 are located closer to the center of the occupant 20 than the engagement points P33 and P34, the side cushion 100 is pulled tightly toward the occupant 20 when deployed, thereby increasing the force with which movement of the occupant 20 is restricted, thus further enhancing the occupant protection effect.

Figure 6:
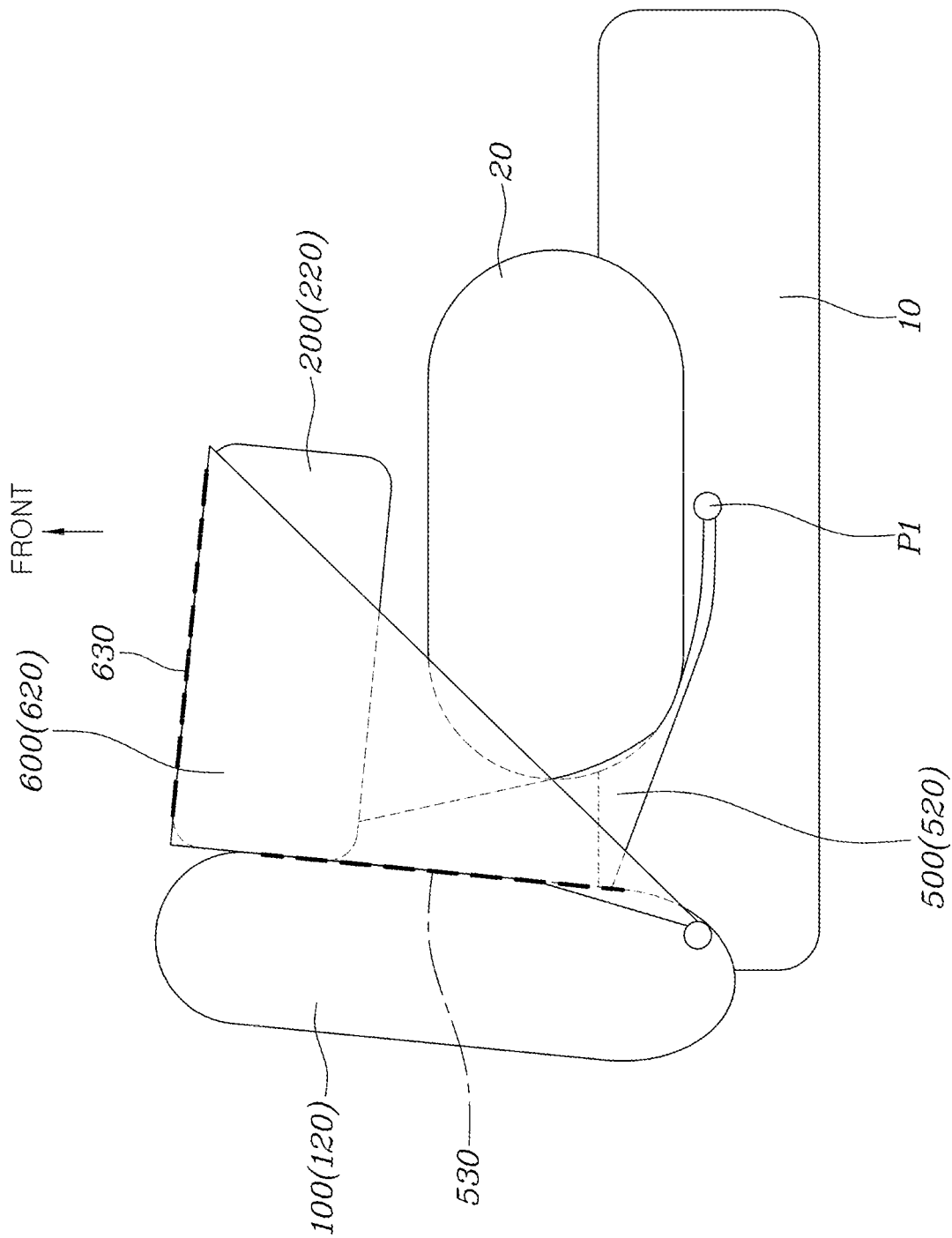
FIG. 6 is a view illustrating the deployed state of the lower-side surface tether according to one form of the present disclosure when a side cushion is deployed.

Further, as shown in FIG. 6, when deployed, the lower-side surface tether 500 is deformed so as to bend toward the occupant 20 due to interference with the occupant 20, and tension occurs upon deformation of the lower-side surface tether 500, whereby the side cushion 100 and the front cushion 200 are respectively pulled toward the lateral sides and the front of the occupant 20, thereby further increasing the force with which movement of the occupant 20 is restricted.

Further, as shown in FIG. 7, the present disclosure is configured such that the upper separator 710 mounted in the side cushion 100, the upper-side surface tether 300, and the sewing line 330 of the upper-side surface tether 300 are aligned with each other in the lateral direction and such that the lower separator 720 mounted in the side cushion 100, the lower-side surface tether 500, and the sewing line 530 of the lower-side surface tether 500 are aligned with each other in the lateral direction.

Accordingly, when the side cushion 100 is deployed, the pulling force of the upper-side surface tether 300 and the lower-side surface tether 500 is transmitted to the outer surface 101 of the side cushion 100 via the upper separator 710 and the lower separator 720. As a result, the outer surface 101 of the side cushion 100 is pulled in an inward direction (indicated by the arrow M3), oriented toward the occupant 20, whereby the entirety of the side cushion 100 is tightly pulled toward the occupant 20 when deployed, thereby further increasing the force with which movement of the occupant 20 is restricted.

As shown in FIG. 8, the form of the present disclosure is configured such that the right upper-side surface tether 310 and the left upper-side surface tether 320, which constitute the upper-side surface tether 300, are disposed bilaterally symmetrically with respect to the seatback 10 and are connected to each other via a first connection tether 810.

Respective ends of the first connection tether 810 are sewn to the right upper-side surface tether 310 and the left upper-side surface tether 320.

When the upper-side surface tether 300 is deployed, the first connection tether 810 generates tension so as to restrict outward spreading of the right upper-side surface tether 310 and the left upper-side surface tether 320. As a result, the right upper-side surface tether 310 and the left upper-side surface tether 320 are capable of more effectively protecting the occupant with increased restricting force.

In addition, as shown in FIG. 8, the form of the present disclosure is configured such that the right upper-front surface tether 410 and the left upper-front surface tether 420, which constitute the upper-front surface tether 400, are disposed bilaterally symmetrically with respect to the seatback 10 and are connected to each other via a second connection tether 820.

Respective ends of the second connection tether 820 are sewn to the right upper-front surface tether 410 and the left upper-front surface tether 420.

When the upper-front surface tether 400 is deployed, the second connection tether 820 generates tension so as to restrict outward spreading of the right upper-front surface tether 410 and the left upper-front surface tether 420. As a result, the right upper-front surface tether 410 and the left upper-front surface tether 420 are capable of more effectively protecting the occupant with increased restricting force.

In one form, the second connection tether 820 is located at a position further forward than the first connection tether 810 so as to be adjacent to the back of the neck of the occupant 20. As such, since the second connection tether 820 is located as far forward as possible while avoiding interference with the occupant 20, the second connection tether 820 is capable of maximally restricting outward spreading of the upper-front surface tether 400.

In another form, as shown in FIG. 9, the right upper-side surface tether 310 and the left upper-side surface tether 320, which constitute the upper-side surface tether 300, are disposed bilaterally symmetrically and are directly connected to each other in a sewing engagement manner such that a sewing engagement point S1 therebetween is located behind the head of the occupant 20 upon deployment thereof, whereby the right upper-side surface tether 310 and the left upper-side surface tether 320 are restricted from spreading outwards when deployed.

Further, the right upper-front surface tether 410 and the left upper-front surface tether 420, which constitute the upper-front surface tether 400, are disposed bilaterally symmetrically and are directly connected to each other in a sewing engagement manner such that a sewing engagement point S2 therebetween is located behind the head of the occupant 20 upon deployment thereof, whereby the right upper-front surface tether 410 and the left upper-front surface tether 420 are restricted from spreading outwards when deployed.

As is apparent from the above description, a seat airbag apparatus for a vehicle according to forms of the present disclosure is configured such that a side cushion is deployed so as to protrude forward from a seatback in order to protect the lateral sides of an occupant and a front cushion is deployed so as to protrude from the side cushion to the front of the occupant in order to protect the front side of the occupant. The seat airbag apparatus is applicable to autonomous vehicles, in which seats are configured to freely move or rotate and occupants take various sitting postures, and is capable of more effectively protecting occupants, particularly those of autonomous vehicles.

In addition, according to forms of the present disclosure, tethers for limiting deployment of the side cushion and the front cushion are configured as surface tethers having a predetermined area, and have an upper dual-surface tether structure, formed by an upper-side surface tether and an upper-front surface tether, and a lower dual-surface tether structure, formed by a lower-side surface tether and a lower-front surface tether, in order to secure sufficient force for limiting deployment of the side cushion and the front cushion, thereby effectively restricting the movement of an occupant in lateral, forward, and oblique directions with increased restricting force and further enhancing the occupant protection effect, thus reducing the risk of injury to the occupant in the event of an accident.

Although exemplary forms of the present disclosure have been disclosed for illustrative purposes, those skilled in the art will appreciate that various modifications, additions and substitutions are possible, without departing from the scope and spirit of the present disclosure as disclosed in the accompanying claims.

What is claimed is:

1. A seat airbag apparatus for a vehicle, the seat airbag apparatus comprising:
    a side cushion configured to be deployed so as to protrude forward from a seatback;
    a front cushion configured to be deployed so as to protrude from the side cushion to a front of an occupant;
    an upper-side surface tether configured to:
        connect the side cushion to an upper end of the seatback,
        spread in a shape of a plane when the side cushion is deployed, and
        limit deployment of the side cushion; and
    an upper-front surface tether configured to:
        connect the front cushion to the upper end of the seatback,
        spread in a shape of a plane when the front cushion is deployed, and
        limit deployment of the front cushion,
    wherein the upper-side surface tether comprises two upper-side surface tethers disposed bilaterally symmetrically, and
    wherein the two upper-side surface tethers are connected to each other in a sewing engagement manner such that a sewing engagement point therebetween is located behind a head of the occupant upon deployment so as to be restricted from spreading outwards when deployed.

2. The seat airbag apparatus of claim 1, further comprising:
    a lower-side surface tether configured to:
        connect the side cushion to a lower end portion of the seatback,
        spread in a shape of a plane when the side cushion is deployed, and
        limit deployment of the side cushion and inhibit the side cushion from lifting; and
    a lower-front surface tether configured to:
        connect the front cushion to the lower end portion of the seatback,
        spread in a shape of a plane when the front cushion is deployed and
        limit deployment of the front cushion and inhibit the front cushion from lifting.

3. The seat airbag apparatus of claim 2, wherein each of the side cushion, the front cushion, the upper-front surface tether, the lower-side surface tether, and the lower-front surface tether is formed so as to be bilaterally symmetrical.

4. The seat airbag apparatus of claim 2, wherein the lower-side surface tether is configured to be deployed in a shape of a triangle, and
    wherein any one vertex of the lower-side surface tether is fixedly engaged with a center portion of a lower end portion of the seatback, and one edge of the lower-side surface tether is sewn to a lower end portion of an inner surface of the side cushion.

5. The seat airbag apparatus of claim 4, wherein the lower-side surface tether is deformed so as to bend toward the occupant due to interference with the occupant when deployed, and
    wherein the side cushion and the front cushion are respectively pulled toward lateral sides and the front of the occupant by deformation of the lower-side surface tether so as to increase a force with which movement of the occupant is restricted.

6. The seat airbag apparatus of claim 2, wherein the lower-front surface tether is configured to be deployed in a shape of a triangle, and wherein any one vertex of the lower-front surface tether is fixedly engaged with a side portion of a lower end portion of the seatback, and one edge of the lower-front surface tether is sewn to a bottom surface of the front cushion.

7. The seat airbag apparatus of claim 1, wherein the upper-side surface tether and the upper-front surface tether are configured to be deployed over shoulders of the occupant so as to avoid injury to a neck of the occupant.

8. The seat airbag apparatus of claim 1, wherein the upper-side surface tether is formed so as to be deployed in a shape of a triangle, and wherein any one vertex of the upper-side surface tether is fixedly engaged with the upper end of the seatback, and one edge of the upper-side surface tether is sewn to an upper end of an inner surface of the side cushion.

9. The seat airbag apparatus of claim 8, wherein vertices of the two upper-side surface tethers are fixedly engaged with the upper end of the seatback at a same engagement point within an engagement region of a headrest.

10. The seat airbag apparatus of claim 8, wherein vertices of the two upper-side surface tethers are fixedly engaged with the upper end of the seatback at different engagement points within an engagement region of a headrest such that the two upper-side surface tethers are crossed in an X-shape.

11. The seat airbag apparatus of claim 8, wherein vertices of the two upper-side surface tethers are fixedly engaged with the upper end of the seatback at engagement points laterally spaced apart from each other within an engagement region of a headrest such that the two upper-side surface tethers are arranged in a V-shape.

12. The seat airbag apparatus of claim 1, wherein the upper-front surface tether is configured to be deployed in a shape of a triangle, and wherein any one vertex of the upper-front surface tether is fixedly engaged with the upper end of the seatback, and one edge of the upper-front surface tether is sewn to a top surface of the front cushion.

13. The seat airbag apparatus of claim 12, wherein the upper-front surface tether comprises two upper-front surface tethers disposed bilaterally symmetrically, and wherein vertices of the two upper-front surface tethers are fixedly engaged with the upper end of the seatback at different engagement points out of an engagement region of a headrest.

14. The seat airbag apparatus of claim 2, wherein an upper separator and a lower separator having vent holes formed therein are mounted such that the upper separator and the lower separator are vertically spaced apart from each other in the side cushion, wherein the upper separator, the upper-side surface tether, and a sewing line of the upper-side surface tether are aligned with each other in a lateral direction, and wherein the lower separator, the lower-side surface tether, and a sewing line of the lower-side surface tether are aligned with each other in the lateral direction.

15. The seat airbag apparatus of claim 1, wherein the two upper-side surface tethers are connected to each other via a first connection tether so as to be restricted from spreading outwards when deployed.

16. The seat airbag apparatus of claim 15, wherein the upper-front surface tether comprises two upper-front surface tethers disposed bilaterally symmetrically, and wherein the two upper-front surface tethers are connected to each other via a second connection tether so as to be restricted from spreading outwards when deployed.

17. The seat airbag apparatus of claim 16, wherein the second connection tether is located at a position further forward than the first connection tether so as to be adjacent to a back of a neck of an occupant.

18. The seat airbag apparatus of claim 1, wherein the upper-front surface tether comprises two upper-front surface tethers disposed bilaterally symmetrically, and wherein the two upper-front surface tethers are directly connected to each other in a sewing engagement manner such that a sewing engagement point therebetween is located behind a head of the occupant upon deployment so as to be restricted from spreading outwards when deployed.

19. A seat airbag apparatus for a vehicle, the seat airbag apparatus comprising:

a side cushion configured to be deployed so as to protrude forward from a seatback;

a front cushion configured to be deployed so as to protrude from the side cushion to a front of an occupant;

an upper-side surface tether configured to:
connect the side cushion to an upper end of the seatback,
spread in a shape of a plane when the side cushion is deployed, and
limit deployment of the side cushion; and an upper-front surface tether configured to:
connect the front cushion to the upper end of the seatback,
spread in a shape of a plane when the front cushion is deployed, and
limit deployment of the front cushion, wherein the upper-front surface tether comprises two upper-front surface tethers disposed bilaterally symmetrically, and wherein the two upper-front surface tethers are directly connected to each other in a sewing engagement manner such that a sewing engagement point therebetween is located behind a head of the occupant upon deployment so as to be restricted from spreading outwards when deployed.

* * * * *